United States Patent
Chen

(10) Patent No.: US 8,576,738 B2
(45) Date of Patent: Nov. 5, 2013

(54) METHOD, APPARATUS AND SYSTEM FOR SHARING A SUBCHANNEL

(75) Inventor: Bin Chen, Rolling Meadows, IL (US)

(73) Assignee: Huawei Technologies Co., Ltd, Shenzhen (CN)

( * ) Notice: Subject to any disclaimer, the term of this patent is extended or adjusted under 35 U.S.C. 154(b) by 248 days.

(21) Appl. No.: 13/073,051

(22) Filed: Mar. 28, 2011

(65) Prior Publication Data

US 2011/0176445 A1 Jul. 21, 2011

Related U.S. Application Data

(63) Continuation of application No. PCT/CN2009/074297, filed on Sep. 28, 2009.

(30) Foreign Application Priority Data

Sep. 28, 2008 (CN) .......................... 2008 1 0168816

(51) Int. Cl.
*G01R 31/08* (2006.01)

(52) U.S. Cl.
USPC ........... 370/252; 370/209; 370/342; 370/335; 370/455; 370/525; 375/130; 375/141; 455/522; 455/572

(58) Field of Classification Search
USPC ......... 370/342, 347, 208, 209, 335, 337, 374, 370/455, 525, 526, 252; 375/130, 141; 455/522, 422, 572
See application file for complete search history.

(56) References Cited

U.S. PATENT DOCUMENTS

| | | | | |
|---|---|---|---|---|
| 5,982,760 | A * | 11/1999 | Chen | 370/335 |
| 6,154,659 | A * | 11/2000 | Jalali et al. | 455/522 |
| 6,330,462 | B1 * | 12/2001 | Chen | 455/572 |
| 6,434,367 | B1 * | 8/2002 | Kumar et al. | 455/70 |
| 6,639,936 | B2 * | 10/2003 | Kanterakis et al. | 375/130 |
| 7,010,322 | B2 * | 3/2006 | Kim et al. | 455/522 |
| 7,046,717 | B2 * | 5/2006 | Kanterakis et al. | 375/141 |
| 7,236,801 | B2 * | 6/2007 | Yun et al. | 455/522 |
| 7,418,269 | B2 * | 8/2008 | Edwards | 455/522 |
| 2005/0070320 | A1 * | 3/2005 | Dent | 455/516 |
| 2008/0031172 | A1 * | 2/2008 | Nanda et al. | 370/310.1 |

(Continued)

FOREIGN PATENT DOCUMENTS

| | | |
|---|---|---|
| CN | 1449205 | 10/2003 |
| CN | 1909440 | 2/2007 |

(Continued)

OTHER PUBLICATIONS

3GPP TSG-RAN WG1 Meeting #44, Denver, USA, Feb. 13-17, 2006 "L1/L2 Control Channel Structure for E-UTRA Downlink" R1-060301 (pp. 1-9).

(Continued)

*Primary Examiner* — Andrew Lai
*Assistant Examiner* — Andrew C Lee
(74) *Attorney, Agent, or Firm* — Staas & Halsey LLP

(57) ABSTRACT

A method, an apparatus and a system for sharing a subchannel are disclosed. The method includes: obtaining downlink state information and uplink state information of a subchannel; and scheduling the subchannel according to the downlink state information and uplink state information of the subchannel, and allocating the subchannel to an uplink Mobile Station (MS) and/or a downlink MS. The method improves efficiency and flexibility of sharing subchannels, and therefore improves overall traffic significantly.

12 Claims, 6 Drawing Sheets

(56) References Cited

U.S. PATENT DOCUMENTS

| | | | |
|---|---|---|---|
| 2008/0031224 A1* | 2/2008 | Nanda et al. | 370/350 |
| 2008/0045139 A1* | 2/2008 | Chen et al. | 455/3.04 |
| 2008/0219213 A1 | 9/2008 | Natarajan et al. | |
| 2009/0059819 A1* | 3/2009 | Choi et al. | 370/280 |
| 2009/0086861 A1* | 4/2009 | Yavuz et al. | 375/346 |
| 2009/0097449 A1* | 4/2009 | Jin | 370/331 |
| 2009/0196249 A1 | 8/2009 | Kawamura et al. | |
| 2009/0239466 A1* | 9/2009 | Saitou et al. | 455/11.1 |
| 2009/0252079 A1* | 10/2009 | Zhang et al. | 370/315 |
| 2010/0054171 A1* | 3/2010 | Zhu et al. | 370/315 |
| 2011/0176445 A1 | 7/2011 | Chen | |

FOREIGN PATENT DOCUMENTS

| | | |
|---|---|---|
| CN | 1960352 | 5/2007 |
| CN | 101079660 | 11/2007 |
| CN | 101132204 | 2/2008 |
| CN | 101686466 | 3/2010 |
| EP | 2023516 A1 | 2/2009 |
| EP | 2031888 A1 | 3/2009 |
| WO | 2007/138664 A1 | 12/2007 |
| WO | 2007/148583 | 12/2007 |
| WO | 2007/148583 A1 | 12/2007 |

OTHER PUBLICATIONS

International Search Report, mailed Jan. 7, 2010, in corresponding International Application No. PCT/CN2009/074297 (7 pp.).

Written Opinion of the International Searching Authority issued Jan. 7, 2010 in corresponding International Patent Application PCT/CN2009/074297 (5 pages) (5 pages English Translation).

Mori, K. et al., *Downlink Multihop Transmission Scheme for Azymmetric Traffic Accommodation in CDMA/FDD Cellular Systems*, The 18$^{th}$ Annual IEEE International Symposium on Personal, Indoor and Mobile Radio Communications, 2007, (5 pp.).

Marques, P., *Opportunistic use of 3G uplink licensed bands*, Dec. 5, 2008, (7 pp.).

Office Action, mailed Apr. 8, 2010, in Chinese Patent Application No. 200810168816.X (17 pp.).

European Search Report dated Jan. 19, 2012 issued in corresponding European Patent Application No. 09815637.5.

European Office Action mailed Aug. 9, 2013 in corresponding European Patent Application No. 09 815 637.5-1851 (6 pages).

* cited by examiner

METHOD, APPARATUS AND SYSTEM FOR SHARING A SUBCHANNEL

CROSS-REFERENCE TO RELATED APPLICATIONS

This application is a continuation of International Application No. PCT/CN2009/074297, filed on Sep. 28, 2009, which claims priority to Chinese Patent Application No. 200810168816.X, filed on Sep. 28, 2008, both of which are hereby incorporated by reference in their entireties.

FIELD OF THE INVENTION

The present invention relates to communications technologies, and in particular, to a method, an apparatus, and a system for sharing a subchannel.

BACKGROUND OF THE INVENTION

At present, almost all spectrum resources of the low-frequency band have been allocated to mobile operators. New wireless communication technologies such as Worldwide Interoperability for Microwave Access (WiMAX) and $3^{rd}$ Generation Partnership Project (3GPP) Long Term Evolution (LTE) can use frequencies in the high-frequency band only, for example, 2.6 GHz, 3.5 GHz, or even over 5 GHz. Radio frequency signals attenuate as the transmission distance increases. Higher frequencies incur more attenuation. That is, the higher the frequency band is, the faster the attenuation will be. Higher frequencies make cell coverage narrower, and even too narrow to meet radio communication requirements.

Therefore, spectrum sharing is an urgent requirement of mobile operators. In a first prior art, an Opportunistic Radio (OR) system is put forward. The OR system coexists with a 3G Universal Mobile Telecommunications System (UMTS), in which the 3G UMTS is a primary system and the OR system is a secondary system. The OR system perceives the usage of the uplink spectrum of the 3G UMTS system to use the uplink band, and measures the interference caused by the OR system onto a Base Station (BS) to control the transmit (TX) power and reduce interference onto the uplink receiving of the 3G UMTS system. In a second prior art, in a cellular system based on Code Division Multiple Access (CDMA)/Frequency Division Multiplexing (FDD), multi-hop transmission is applied, and the uplink spectrum is used on the second hop to transmit downlink data, which overcomes the shortage of downlink spectrum resources when the uplink service is not symmetric to the downlink service.

The prior arts have at least the following problems: The first prior art is not applicable to an Orthogonal Frequency Division Multiple Access (OFDMA) system, and leads to low efficiency of spectrum sharing; it needs to use free channel resources of the primary system, which further reduces the efficiency of spectrum sharing; the primary system does not interwork with the secondary system, which increases interference and reduces the sharing efficiency. The prerequisite of the second prior art is that the two systems are based on the same radio access technology, which reduces flexibility of the system and flexibility of sharing subchannels.

SUMMARY OF THE INVENTION

Embodiments of the present invention provide a method, an apparatus and a system for sharing a subchannel to improve efficiency and flexibility of sharing subchannels, and improve overall traffic significantly.

A method for sharing a subchannel in an embodiment of the present invention includes:
obtaining downlink state information and uplink state information of a subchannel; and
scheduling the subchannel according to the downlink state information and uplink state information of the subchannel, and allocating the subchannel to an uplink Mobile Station (MS) and/or a downlink MS.

Another method for sharing a subchannel in an embodiment of the present invention includes:
scheduling a subchannel according to state information of the subchannel, and sending a scheduling command to an uplink or downlink MS;
measuring uplink or downlink interference suffered; and
sending power control information to another scheduling unit if the uplink or downlink interference is greater than a preset threshold.

An apparatus for sharing an uplink spectrum in an embodiment of the present invention includes:
an obtaining module, configured to obtain downlink state information and uplink state information of a subchannel; and
a scheduling module, configured to schedule the subchannel according to the downlink state information and uplink state information of the subchannel, and allocate the subchannel to an uplink MS and/or a downlink MS.

Another apparatus for sharing an uplink spectrum in an embodiment of the present invention includes:
a channel scheduling module, configured to schedule a subchannel according to state information of the subchannel;
a scheduling command sending module, configured to send a scheduling command to an uplink or downlink MS;
a measuring module, configured to measure uplink or downlink interference suffered;
a comparing module, configured to compare the uplink or downlink interference measured by the measuring module with a preset threshold, and trigger an information sending module if the uplink or downlink interference is greater than the preset threshold; and
the information sending module, configured to send power control information to another scheduling unit.

A system for sharing an uplink spectrum in an embodiment of the present invention includes:
a BS, configured to obtain downlink state information and uplink state information of a subchannel, schedule the subchannel according to the downlink state information and uplink state information of the subchannel, and allocate the subchannel to an uplink MS and/or a downlink MS;
the uplink MS, configured to receive a scheduling command sent by the BS;
the downlink MS, configured to measure and report state information of a downlink subchannel; and
a relay station, configured to receive the state information sent by the downlink MS and send the state information of the downlink subchannel to the BS.

Another system for sharing an uplink spectrum in an embodiment of the present invention includes:
an uplink scheduling unit, configured to: schedule a subchannel according to state information of the subchannel and send a scheduling command to an uplink MS; measure uplink interference suffered; and send power control information to a downlink scheduling unit if the uplink interference is greater than a preset threshold;
the downlink scheduling unit, configured to: schedule the subchannel according to state information of the subchannel and send a scheduling command to a downlink MS; measure downlink interference suffered; and send power control information to the uplink scheduling unit if the downlink interference is greater than a preset threshold;

the uplink MS, configured to receive the scheduling command sent by the uplink scheduling unit; and the downlink MS, configured to receive the scheduling command sent by the downlink scheduling unit.

Compared with the prior arts, the embodiments of the present invention bring at least the following benefits:

In the method provided herein, the uplink subchannel is scheduled according to the state information of the downlink subchannel and the state information of the uplink subchannel, and the uplink subchannel is allocated to the uplink MS and/or downlink MS, and then a scheduling command is sent to the uplink MS and downlink MS. The technical solution disclosed herein takes account of both the state information of the uplink subchannel and the state information of the downlink subchannel, and improves efficiency and flexibility of spectrum sharing.

BRIEF DESCRIPTION OF THE DRAWINGS

To illustrate the technical solution under the present invention more clearly, the following outlines the accompanying drawings involved in the description of the embodiments of the present invention. Apparently, the accompanying drawings outlined below are illustrative and not exhaustive. Persons of ordinary skill in the art can derive other drawings from such accompanying drawings without any creative effort.

DETAILED DESCRIPTION OF THE EMBODIMENTS

The following detailed description is provided with reference to the accompanying drawings to provide a thorough understanding of the present invention. Evidently, the drawings and the detailed description are merely representative of particular embodiments of the present invention rather than all embodiments. All other embodiments, which can be derived by those skilled in the art from the embodiments given herein without any creative effort, shall fall within the scope of the present invention.

The embodiments of the present invention provide a method, an apparatus and a system for sharing a subchannel to improve efficiency and flexibility of sharing subchannels, and improve overall traffic significantly.

The following describes the method and apparatus for sharing a subchannel in more detail with reference to accompanying drawings and exemplary embodiments.

Figure 1:
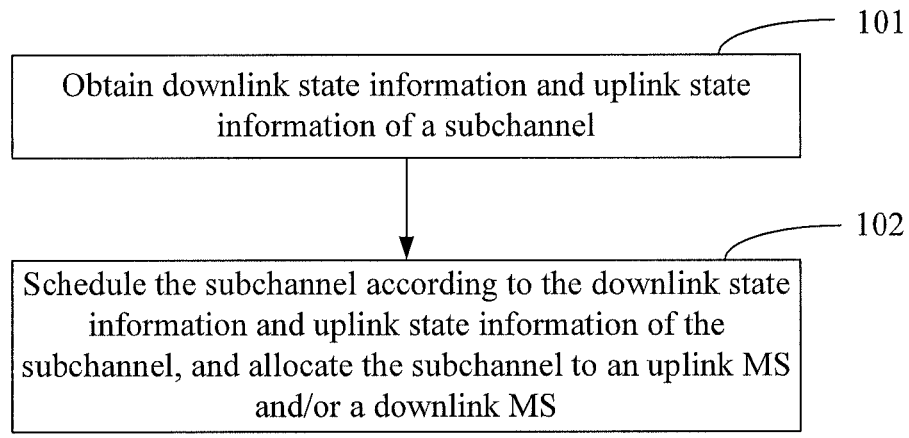
FIG. 1 is a flowchart of a method for sharing a subchannel in an embodiment of the present invention.

As shown in FIG. 1, a method for sharing a subchannel in an embodiment of the present invention includes the following steps:

Step 101: Obtain downlink state information and uplink state information of a subchannel.

The downlink MS measures the downlink state of the subchannel, and sends downlink state information to the relay station; and the relay station sends the downlink state information to the BS after processing the downlink state information or without processing the downlink state information; meanwhile, the BS measures the uplink state of the subchannel on the uplink MS, and obtains uplink state information.

Step 102: Schedule the subchannel according to the downlink state information and uplink state information of the subchannel, and allocate the subchannel to the uplink MS and/or downlink MS.

The BS schedules the subchannel according to a preset scheduling algorithm.

The scheduling algorithm is: Calculate the sum of the uplink traffic of the uplink MS corresponding to the subchannel and the downlink traffic of the downlink MS corresponding to the subchannel according to the channel quality and the interference information in the uplink state information and downlink state information of the subchannel; select the subchannel with the greatest sum of traffic and find the corresponding uplink MS and downlink MS, and allocate the selected subchannel to the corresponding uplink MS and downlink MS. For example, use the channel quality and the interference in the downlink state information and uplink state information of the subchannel as input, and schedule the subchannel according to the input; select the subchannel with the greatest channel quality and least interference in the uplink and downlink state information, and find the corresponding uplink MS and downlink MS; and allocate the selected subchannel to the uplink MS and downlink MS.

Alternatively, the scheduling algorithm is: Use the channel quality and interference in the uplink state information as input, calculate a ratio of the channel quality to the interference for each subchannel, and select the subchannel with the greatest ratio and the corresponding uplink MS as a combination; use the channel quality and interference in the downlink state information as input, calculate the ratio of the channel quality to the interference for each subchannel, and select the subchannel with the smallest ratio and the corresponding downlink MS as a combination; compare the ratio of the uplink channel quality to interference with the ratio of the downlink channel quality to interference; and allocate the subchannel in the combination with the greater ratio to the uplink MS or downlink MS in this combination. This algorithm allocates a subchannel to either the uplink MS or the downlink MS, and is more applicable when a short distance exists between the uplink MS and the downlink MS because the short distance leads to great interference.

Through the foregoing steps, the subchannel is scheduled according to the uplink state information and downlink state information of the subchannel, and the subchannel is allocated to the uplink MS and/or downlink MS. The scheduling takes account of both the uplink state information and the downlink state information, thus improving the efficiency of sharing subchannels and reducing interference.

Figure 2:
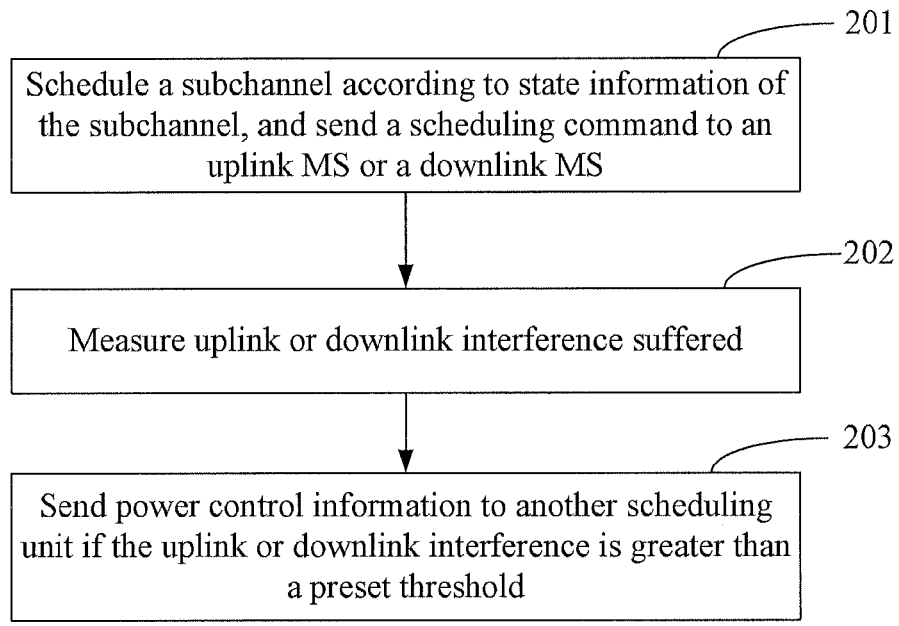
FIG. 2 is a flowchart of a method for sharing a subchannel in another embodiment of the present invention.

By using the method provided above, the BS can exercise control to allocate the subchannel to the uplink MS and/or downlink MS. In another embodiment of the present invention, a method for sharing a subchannel uses the uplink scheduling unit to allocate a subchannel to the uplink MS, and uses the downlink scheduling unit to allocate a subchannel to the downlink MS; and the TX power of the uplink MS and downlink MS is controlled to reduce interference. As shown in FIG. 2, the method in this embodiment includes the following steps:

Step 201: Schedule a subchannel according to state information of the subchannel, and send a scheduling command to an uplink or downlink MS. The uplink scheduling unit and the downlink scheduling unit use the state information of the subchannel as input of the preset algorithm to schedule the subchannel. The uplink scheduling unit uses the channel quality and interference in the uplink state information as input, selects the subchannel with the greatest channel quality and least interference according to the input and an uplink MS corresponding to the subchannel as a combination, and allocates the subchannel in this combination to the uplink MS in this combination; the downlink scheduling unit uses the channel quality and interference in the downlink state information as input, selects the subchannel with the greatest channel quality and least interference according to the input and a downlink MS corresponding to the subchannel as a combination, and allocates the subchannel in this combination to the downlink MS in this combination.

Step 202: Measure uplink or downlink interference suffered.

The downlink MS measures the downlink interference suffered; and the uplink scheduling unit or uplink MS measures the uplink interference suffered. The measurement may be performed according to the prior art.

Step 203: Send power control information to another scheduling unit if the uplink or downlink interference is greater than a preset threshold.

When the uplink interference is greater than the preset threshold, the power control information is sent to the downlink scheduling unit; when the downlink interference is greater than the preset threshold, the power control information is sent to the uplink scheduling unit; after receiving the power control information, the uplink scheduling unit sends an adjustment command to the uplink MS to adjust the TX power; or, after receiving the power control information, the downlink scheduling unit sends an adjustment command to the downlink MS to adjust the TX power.

Through the foregoing steps, the uplink scheduling unit schedules the subchannel according to the uplink state information, and the downlink scheduling unit schedules the subchannel according to the downlink state information, and the mutual interference is reduced through power control.

Figure 3:
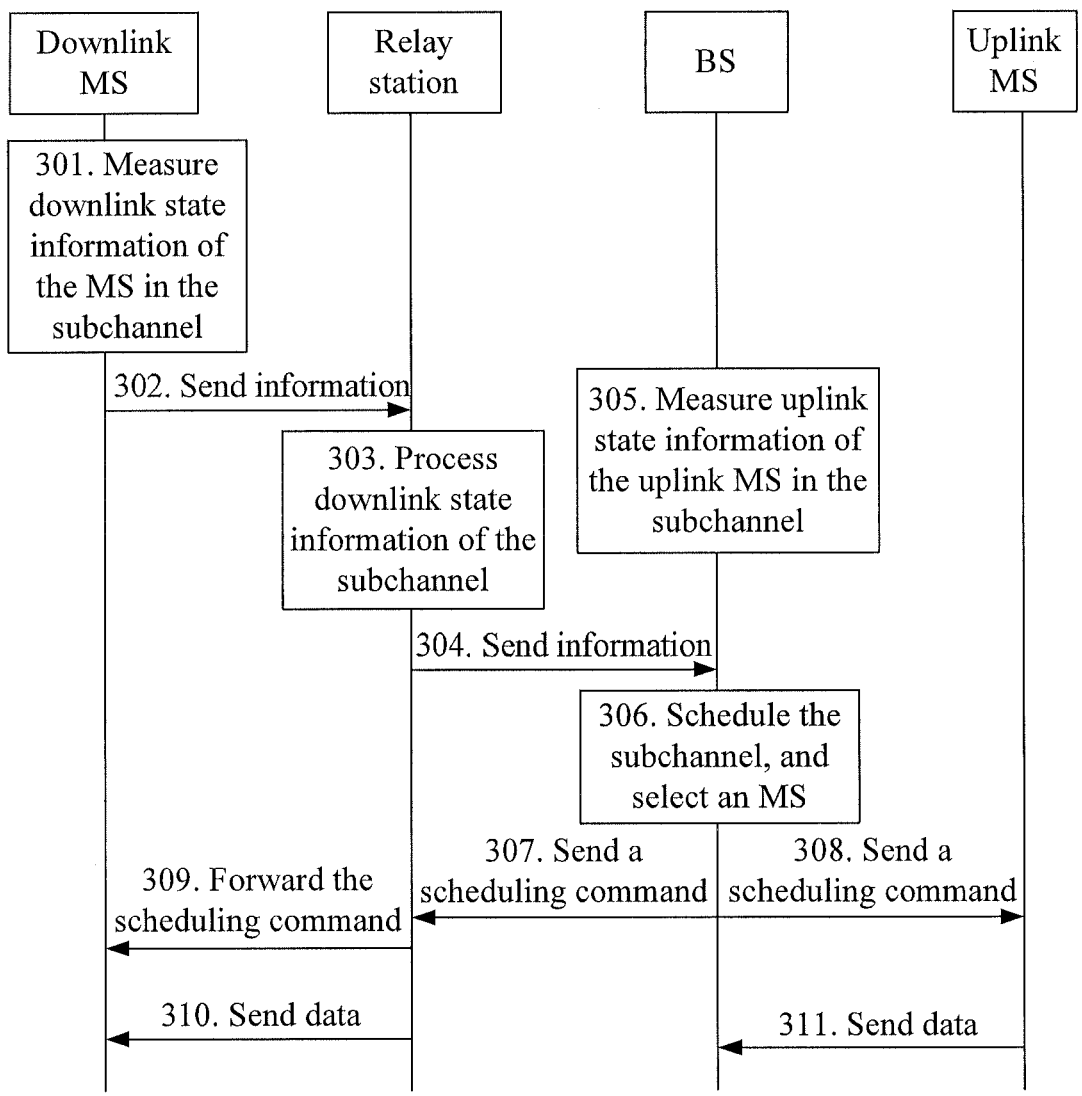
FIG. 3 is a flowchart of a method for sharing a subchannel in an embodiment of the present invention.

The following provides details of a method for sharing a subchannel in an embodiment of the present invention. The BS allocates the subchannel to the uplink MS and/or downlink MS according to the downlink state information and uplink state information of the subchannel. As shown in FIG. 3, the method includes the following steps:

Step 301: The downlink MS measures the downlink state information of the subchannel, including information about interference and channel quality. The subchannel here may be a subcarrier in an OFDMA system, or a set of subcarriers combined according to a specific rule, or radio channel resources combined by time and frequencies, or other forms of radio channel resources. The downlink subchannel is used by the downlink MS to send data to the relay station.

Step 302: The downlink MS sends the measured downlink state information of the subchannel to the relay station.

Step 303: The relay station processes the downlink state information of the subchannel. The processing may be operations of filtering and smoothing the state information, or aggregating state information of multiple downlink MSs, or other operations.

Step 304: The relay station sends a measurement report after being processed to the BS.

Step 305: The BS measures the uplink state of the subchannel. The measurement is specific to each uplink MS and each subchannel. Step 305 may be performed before, during or after steps 301-304.

Step 306: The BS schedules the subchannel according to the downlink state information and uplink state information of the subchannel, and selects an MS. Through step 304 and step 305, the BS obtains the downlink state information and uplink state information of the subchannel, and schedules the subchannel according to such information, namely, allocates the subchannel to an uplink MS and/or a downlink MS according to algorithms. The subchannel allocated to the downlink MS is used by the relay station to send downlink data to the downlink MS, and the subchannel allocated to the uplink MS is used by the uplink MS to send uplink data to the BS. One downlink MS or one uplink MS may have one or more subchannels or no subchannel One subchannel may be allocated to downlink MSs only, or to uplink MSs only, or to both downlink MSs and uplink MSs.

Step 307: The BS sends a scheduling command to the relay station. The scheduling command includes information about the subchannel allocated to the downlink MS.

Step 308: The BS sends a scheduling command to the uplink MS. The scheduling command includes information about the subchannel allocated to the uplink MS. Step 308 may be performed before, during or after step 307.

Step 309: After receiving the scheduling command sent by the BS, the relay station forwards the scheduling command to the downlink MS.

Step 310: The relay station sends data to the corresponding downlink MS through the allocated subchannel. The downlink MS and the corresponding subchannel are determined in step 306.

Step 311: The uplink MS sends data to the BS through the allocated subchannel.

Step 311 is performed after step 308, and may be performed before, during or after step 307, step 309, or step 310.

In step 306 in the foregoing embodiment, the BS may schedule the subchannel and select the MS according to different scheduling algorithms.

Scheduling algorithm 1: Schedule the subchannel by maximizing the sum of uplink traffic and downlink traffic.

Through this scheduling algorithm, the subchannel can be allocated to both the uplink MS and the downlink MS. Therefore, this algorithm is more applicable when a longer distance exists between the uplink MS and the downlink MS, and leads to less interference in the case of sharing the subchannel.

The uplink traffic of the uplink MS is added to the downlink traffic of the downlink MS to generate a traffic sum. With the traffic sum being maximized, the overall traffic is maximized. A greedy algorithm of combined subchannel scheduling is put forward here. Emulation indicates that this algorithm improves the overall traffic significantly. This algorithm is described below:

It is assumed that there are K downlink MSs, M uplink MSs, and N subchannels. As measured by the K downlink MSs, the channel quality in the subchannels is $h_D^{k,n}$ k∈ {0, 1, ... K}; n∈{0, 1, ... N}. As measured by the downlink MSs, the interference in the subchannels is $I_{UD}^{k,n}$ k∈ {0, 1, ... K}; n∈{0, 1, ... N}; as measured by the BS, the channel quality of M uplink MSs in the subchannels is $h_U^{m,n}$ m∈{0, 1, ... N}.

Figure 4:
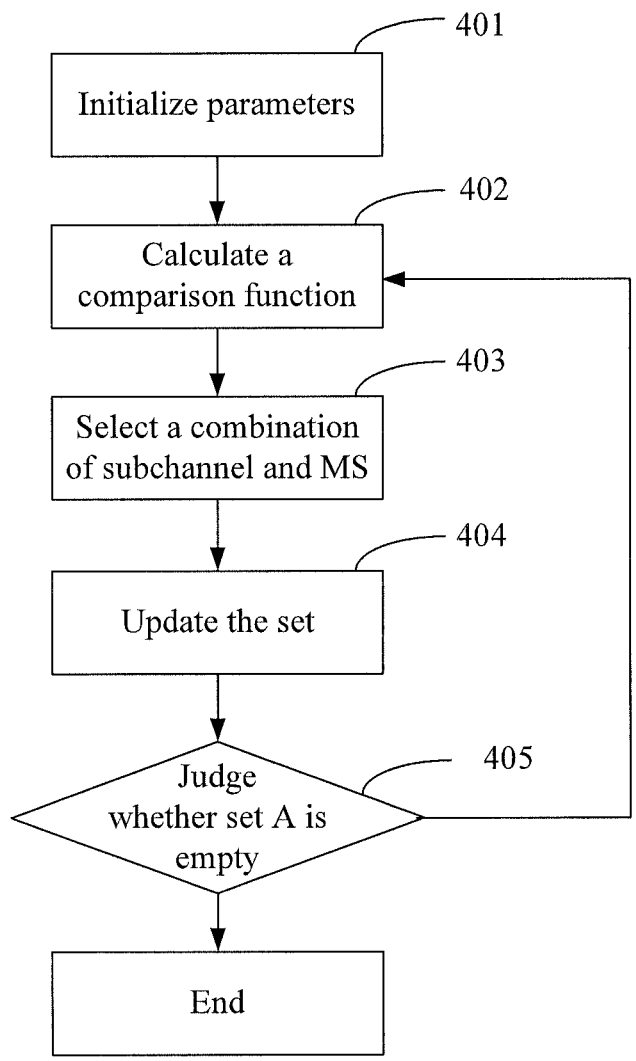
FIG. 4 is a flowchart of a first scheduling algorithm in an embodiment of the present invention.

A comparison function $$\frac{|h_D^{k,n}|^2 \cdot |h_U^{m,n}|^2}{I_{UD}^{k,n} L_U^m}$$

is calculated for each subchannel according to channel quality and interference of each downlink MS in this subchannel, channel quality of the uplink MS, and the number of subchannels allocated to other MSs, where $h_D^{k,n}$ is channel quality (also known as channel gain) of downlink MS k on subchannel n, $h_U^{m,n}$ is channel quality of uplink MS m on subchannel n, $I_{UD}^{k,n}$ is interference suffered by downlink MS k on subchannel n, and $L_U^m$ is the number of subchannels allocated to uplink MS m. As shown in FIG. 4, the scheduling process is detailed below:

Step 401: Initialize parameters; put all unallocated subchannels into set A, which includes N elements in total; put all downlink MSs into set B, which includes N elements in total; put all uplink MSs into set C, which includes M elements in total; configure N empty sets, which are $A^*_n$; configure M empty sets, which are $B^*_m$; and configure M values, which are Lm respectively.

Step 402: Calculate the comparison function $$V_{k,m,n} = \frac{|h_D^{k,n}|^2 \cdot |h_U^{m,n}|^2}{I_{UD}^{k,n} L_U^m}$$

according to N subchannels in A, downlink MSs in B, and uplink MSs in C to obtain K*M*N values of this function.

Step 403: Select a combination of a subchannel and an MS. Select the maximum value among the K*M*N comparison function values, assuming that the maximum value is $V_{k^*,m^*,n^*}$; and select k*, m*, and n* to maximize $$\frac{|h_D^{k^*,n^*}|^2 \cdot |h_U^{m^*,n^*}|^2}{I_{UD}^{k^*,n^*} L_U^{m^*}}.$$

Step 404: Update the sets. Delete n* from set A; put k* and m* into set $A^*_{n^*}$, put n* into set $B^*_{m^*}$, and increase Lm* by 1.

Step 405: Judge whether set A is empty, namely, judge whether all subchannels are allocated. If so, the scheduling process is complete; if not, proceed to step 402.

This scheduling algorithm takes account of channel quality of both the downlink MS and the uplink MS, and allocates a subchannel selected at a single attempt to both the downlink MS and the uplink MS. The power of the uplink MS is distributed in all uplink MSs, and the traffic depends on the power. If one uplink MS has many subchannels, the TX power of the uplink MS on each subchannel is small, and the traffic on each subchannel is low. Therefore, with subchannels being allocated to the uplink MSs which have fewer subchannels, the sum of uplink traffic and downlink traffic is maximized.

After the subchannels are scheduled, power needs to be allocated and controlled. A water-filling algorithm may be applied to allocating power of each downlink MS to each subchannel. Alternatively, on an average basis, the power of a downlink MS is allocated to the subchannels averagely. The power of the downlink MS may be allocated on a relay station or a BS. If the allocation occurs on a BS, the result of power allocation needs to be sent to the relay station. The power of an uplink MS is allocated in the uplink MS according to a water-filling algorithm or an average allocation algorithm.

Scheduling algorithm 2: Schedule the subchannels by avoiding overlapped allocation of subchannels.

This algorithm allocates a subchannel to either the uplink MS or the downlink MS, and is more applicable when a short distance exists between the uplink MS and the downlink MS because the short distance leads to great interference.

The BS allocates a subchannel to one uplink MS or one downlink MS, namely, calculates the comparison function according to the channel quality of the uplink MS and the channel quality and interference of the downlink MS respectively, selects the subchannel with the greatest value of the comparison function, and finds the corresponding MS (uplink MS or downlink MS).

The comparison function is calculated in this way: Calculate $$\frac{|h_D^{k,n}|^2}{I_{UD}^{k,n}}$$

for all subchannels in the set of unallocated subchannels and the corresponding downlink MSs, and calculate $$\frac{|h_U^{m,n}|^2}{I_{RB} L_U^m}$$

for all subchannels in the set of unallocated subchannels and the corresponding uplink MSs, where $I_{RB}$ is interference caused by the relay station onto the BS. Select k* and n* to maximize $$\frac{|h_D^{k^*,n^*}|^2}{I_{UD}^{k^*,n^*}}$$

in all $$\frac{|h_D^{k,n}|^2}{I_{UD}^{k,n}};$$

select m' and n' to maximize $$\frac{|h_U^{m',n'}|^2}{I_{RB} L_U^{m'}}$$

in all $$\frac{|h_U^{m,n}|^2}{I_{RB}};$$

compare $$\frac{|h_D^{k^*,n^*}|^2}{I_{UD}^{k^*,n^*}}$$

with $$\frac{|h_U^{m',n'}|^2}{I_{RB}};$$

if the former is greater, allocate subchannel n* to k*, and delete n* from the set of unallocated subchannels; if the latter is greater, allocate subchannel n' to m', and delete n' from the set of unallocated subchannels. Repeat the foregoing process of calculating the comparison function and selecting the subchannel until the set of unallocated subchannels is empty.

The first scheduling algorithm and the second scheduling algorithm above may be applied together, namely, some subchannels are scheduled through the first scheduling algorithm, and other subchannels are scheduled through the second scheduling algorithm.

By using the method provided in this embodiment, the BS allocates subchannels, and uses different scheduling algorithms according to different conditions, thus improving efficiency and flexibility of allocating subchannels, and improving overall traffic of the system. The uplink idle spectrum is utilized efficiently, and the power control mechanism reduces interference.

Figure 5:
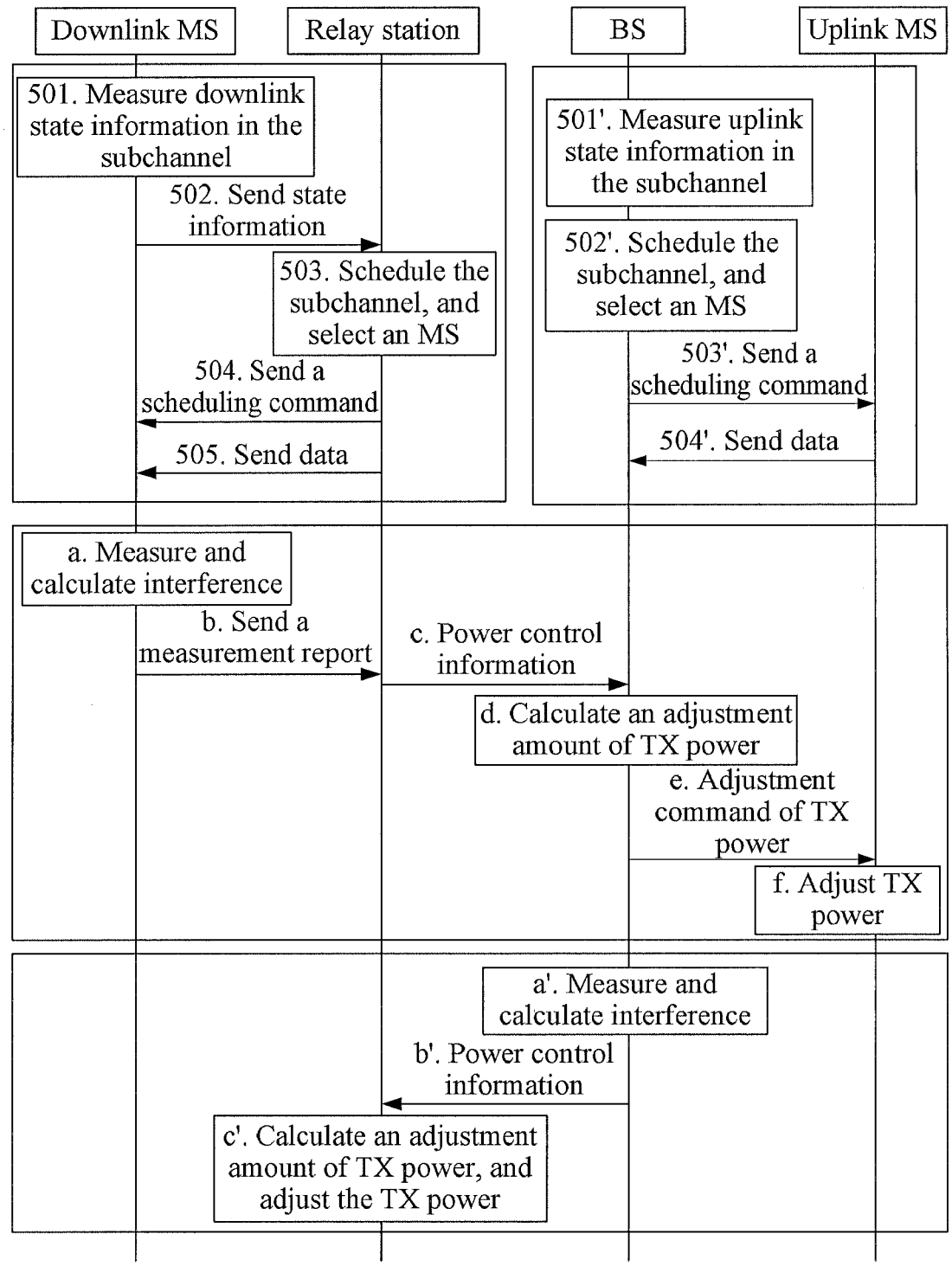
FIG. 5 is a flowchart of a method for sharing a subchannel in an embodiment of the present invention.

As shown in FIG. 5, a method for sharing a subchannel in another embodiment of the present invention includes the following steps:

Step 501: The downlink MS measures state information of the MS on each downlink subchannel. The state information includes interference and channel quality. The subchannel here may be a subcarrier in an OFDMA system, or a set of subcarriers combined according to a specific rule, or radio channel resources combined by time and frequencies, or other forms of radio channel resources. The downlink subchannel is used by the downlink MS to send data to the relay station.

Step 502: The downlink MS sends the measured state information to the relay station.

Step 503: The relay station schedules the subchannel for the downlink MS, and selects the corresponding downlink MS, namely, allocates the proper subchannel to the proper downlink MS.

Step 504: The relay station sends a scheduling command to the selected downlink MS.

Step 505: The relay station sends data to the corresponding downlink MS through the allocated subchannel.

Step 501': The BS measures the uplink state of the subchannel on the uplink MS. The measurement is specific to each uplink MS and each subchannel.

Step 502': The BS schedules subchannels for uplink MSs and selects an uplink MS.

Step 503': The BS sends a scheduling command to the selected uplink MS.

Step 504': The uplink MS sends data to the BS through the subchannel allocated to the uplink MS.

Step a: The downlink MS measures and calculates interference suffered by the downlink MS.

Step b: If the interference is greater than a preset threshold, the downlink MS sends a measurement report about interference to the relay station.

Step c: The relay station sends power control information or interference information to the BS according to the measurement report.

Step d: The BS calculates an amount of Transmit (TX) power to be adjusted or an amount to which Transmit (TX) power is adjusted of the uplink MS according to the power control information or interference information.

Step e: The BS sends a TX power adjustment command to the uplink MS.

Step f: The uplink MS adjusts the uplink TX power according to the command.

Step a': The BS measures and calculates uplink interference suffered.

Step b': The BS sends power control information to the relay station if the uplink interference is greater than a preset threshold.

Step c': The relay station adjusts the downlink TX power according to the power control information.

The foregoing steps are divided into four parts: Through steps 501-505, the relay station schedules the uplink subchannel for the downlink MS; through steps 501'-504', the BS schedules the uplink subchannel for the uplink MS; steps a-f are an interference prevention mechanism for the downlink MS; and steps a'-d' are an interference prevention mechanism for the uplink MS. The four parts are independent of each other with respect to time of implementation.

The scheduling algorithm applied in step 503 is:

Calculate a comparison function $$\frac{|h_D^{k,n}|^2}{I_{UD}^{k,n}}$$

for all subchannels in the set of unallocated subchannels and the corresponding downlink MSs, where $h_D^{k,n}$ is channel quality (also known as channel gain) of downlink MS k on subchannel n, $I_{UD}^{k,n}$ is interference suffered by downlink MS k on subchannel n; select k* and n* to maximize $$\frac{|h_D^{k^*,n^*}|^2}{I_{UD}^{k^*,n^*}};$$

delete n* from the set of unallocated subchannels; and repeat the foregoing process of calculating the comparison function and selecting the subchannel until the set of unallocated subchannels is empty.

The scheduling algorithm applied in step 502' is:

Calculate a comparison function $$\frac{|h_U^{m,n}|^2}{I_{RB}L_U^m}$$

for all subchannels in the set of unallocated subchannels and the corresponding uplink MSs, where $h_U^{m,n}$ is channel quality of uplink MS m on subchannel n, $L_U^m$ is the number of subchannels already allocated to uplink MS m, $I_{RB}$ is interference caused by the relay station onto the BS; select m' and n' to maximize $$\frac{|h_U^{m'n'}|^2}{I_{RB}L_U^{m'}};$$

allocate subchannel n' to m', and delete n' from the set of unallocated subchannels. Repeat the foregoing process of calculating the comparison function and selecting the subchannel until the set of unallocated subchannels is empty.

Compared with the foregoing embodiment, this embodiment cuts back the consumption required for the relay station to send a measurement report to the BS, and the consumption required for the BS to send power control information to the relay station. In the case that many downlink MSs or relay stations exist, much signaling consumption is reduced, and the system performance is improved.

Figure 6:
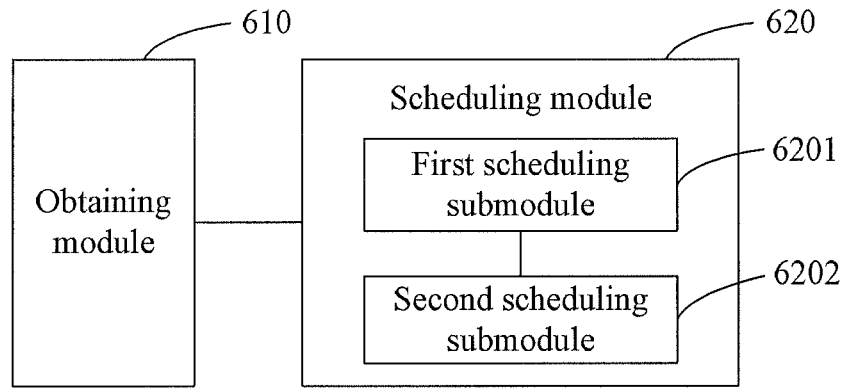
FIG. 6 shows an apparatus for sharing a subchannel in an embodiment of the present invention.

To implement the method provided herein, an apparatus for sharing an uplink spectrum is disclosed in an embodiment of the present invention. The apparatus is located in a BS. As shown in FIG. 6, the apparatus includes:

an obtaining module 610, configured to obtain downlink state information and uplink state information of a subchannel; and a scheduling module 620, configured to schedule the subchannel according to the downlink state information and uplink state information of the subchannel, and allocate the subchannel to an uplink MS and/or a downlink MS.

The scheduling module 620 includes:

a first scheduling submodule 6201, configured to calculate the sum of the uplink traffic of the uplink MS corresponding to the subchannel and the downlink traffic of the downlink MS corresponding to the subchannel according to the channel quality and the interference information in the uplink state information and downlink state information of the subchannel; select the subchannel with the greatest sum of traffic and find the corresponding uplink MS and downlink MS, and allocate the selected subchannel to the corresponding uplink MS and downlink MS; for example, use the channel quality and the interference in the downlink state information and uplink state information of the subchannel as input, and schedule the subchannel according to the input; calculate a ratio of the channel quality to the interference for each subchannel according to the state information, select the subchannel with the greatest ratio, and find the corresponding uplink MS and downlink MS; and allocate the selected subchannel to the uplink MS and downlink MS; and a second scheduling submodule 6202, configured to: use the channel quality and interference in the uplink state information as input, calculate a ratio of channel quality to interference for each subchannel, select the subchannel with the greatest ratio and an uplink MS corresponding to the subchannel as a combination; use the channel quality and interference in the downlink state information as input, calculate a ratio of channel quality to interference for each subchannel, select the subchannel with the smallest ratio and a downlink MS corresponding to the subchannel as a combination; compare the two ratios to find the combination with the greater ratio, and allocate the subchannel in the combination with the greater ratio to the corresponding uplink MS or downlink MS.

Through the foregoing apparatus, the subchannel is scheduled according to the uplink state information and downlink state information of the subchannel, and the subchannel is allocated to the uplink MS and/or downlink MS. The scheduling takes account of both the uplink state information and the downlink state information, thus improving the efficiency of sharing subchannels and reducing interference.

Figure 7:
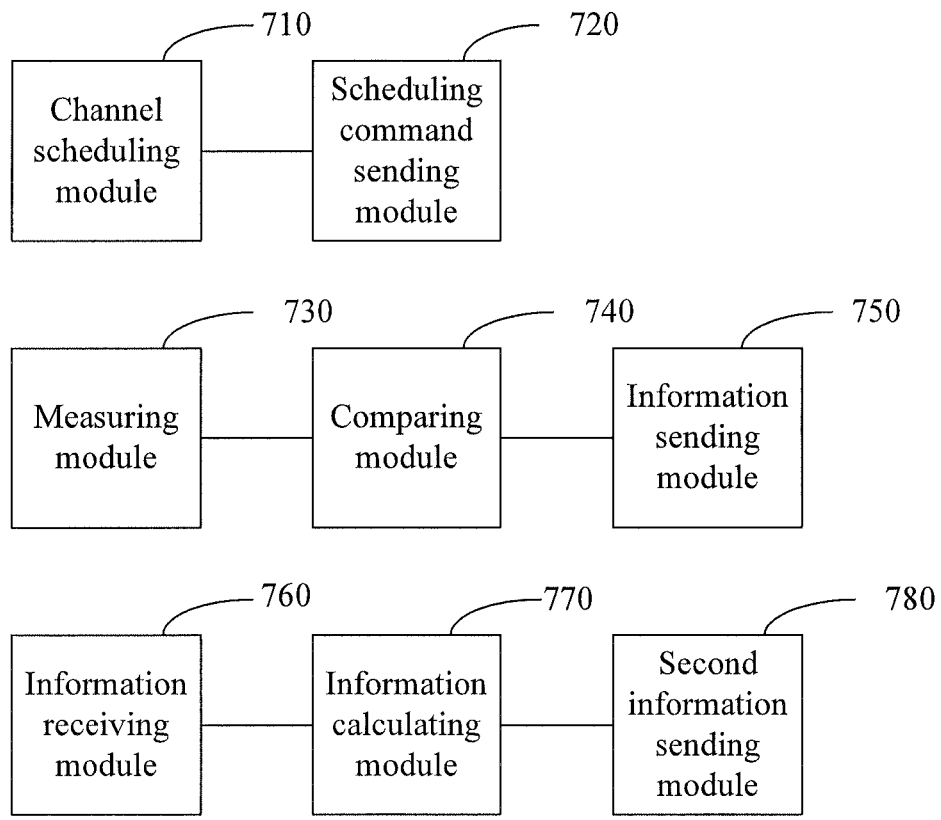
FIG. 7 shows an apparatus for sharing a subchannel in an embodiment of the present invention.

Another apparatus for sharing an uplink spectrum is provided in an embodiment of the present invention. As shown in FIG. 7, the apparatus includes:

a channel scheduling module 710, configured to schedule a subchannel according to state information of the subchannel;

a scheduling command sending module 720, configured to send a scheduling command to an uplink or downlink MS;

a measuring module 730, configured to measure uplink or downlink interference suffered;

a comparing module 740, configured to compare the uplink or downlink interference measured by the measuring module with a preset threshold, and trigger an information sending module 750 if the uplink or downlink interference is greater than the preset threshold; and the information sending module 750, configured to send power control information to another scheduling unit.

When being located in the uplink scheduling unit, the channel scheduling module 710 is configured to use channel quality and interference in the uplink state information as input, select a subchannel with the greatest channel quality and least interference and an uplink MS corresponding to the subchannel as a combination, and allocate the subchannel in this combination to the uplink MS in this combination.

When being located in the downlink scheduling unit, the channel scheduling module 710 is configured to use channel quality and interference in the downlink state information as input, select a subchannel with the greatest channel quality and least interference and a downlink MS corresponding to the subchannel as a combination, and allocate the subchannel in this combination to the downlink MS in this combination.

The apparatus further includes:

an information receiving module 760, configured to receive power control information sent by another scheduling unit;

an information calculating module 770, configured to calculate an amount of Transmit (TX) power to be adjusted or an amount to which Transmit (TX) power is adjusted according to the power control information received by the information receiving module; and a second information sending module 780, configured to send an adjustment command to an uplink MS or a downlink MS.

The foregoing apparatus is located in the uplink scheduling unit or downlink scheduling unit.

Through the foregoing apparatus, the uplink scheduling unit schedules the subchannel according to the uplink state information, and the downlink scheduling unit schedules the subchannel according to the downlink state information, and the mutual interference is reduced through power control.

Figure 8:
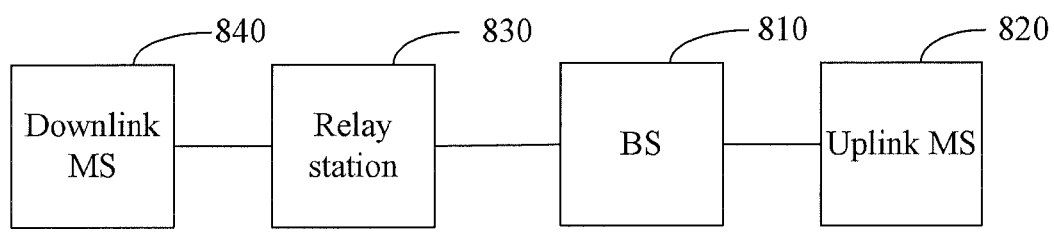
FIG. 8 shows a system for sharing a subchannel in an embodiment of the present invention.

A system for sharing an uplink spectrum is provided in an embodiment of the present invention. As shown in FIG. 8, the system includes:

a BS 810, configured to obtain downlink state information and uplink state information of a subchannel, schedule the subchannel according to the downlink state information and uplink state information of the subchannel, and allocate the subchannel to an uplink MS and/or a downlink MS;

an uplink MS 820, configured to receive a scheduling command sent by the BS;

a downlink MS 840, configured to measure and report state information of a downlink subchannel; and a relay station 830, configured to receive the state information sent by the downlink MS and send the state information of the downlink subchannel to the BS.

Figure 9:
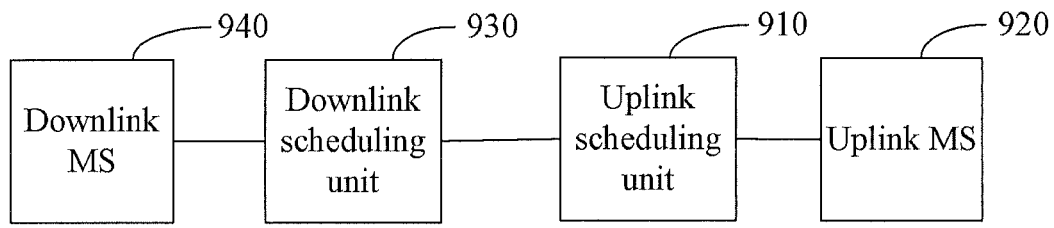
FIG. 9 shows a system for sharing a subchannel in an embodiment of the present invention.

Another system for sharing an uplink spectrum is provided in an embodiment of the present invention. As shown in FIG. 9, the system includes:

an uplink scheduling unit 910, configured to: schedule a subchannel according to state information of the subchannel and send a scheduling command to an uplink MS 920; measure uplink interference suffered; and send power control information to a downlink scheduling unit 930 if the uplink interference is greater than a preset threshold;

the downlink scheduling unit 930, configured to: schedule a subchannel according to state information of the subchannel and send a scheduling command to a downlink MS 940; measure downlink interference suffered; and send power control information to the uplink scheduling unit 910 if the downlink interference is greater than a preset threshold;

the uplink MS 920, configured to receive the scheduling command sent by the uplink scheduling unit; and the downlink MS 940, configured to receive the scheduling command sent by the downlink scheduling unit.

The downlink scheduling unit 930 is further configured to: receive power control information sent by the uplink scheduling unit 910, calculate an amount of Transmit (TX) power to be adjusted or an amount to which Transmit (TX) power is adjusted according to the power control information, and send an adjustment command to the downlink MS 940.

The downlink MS 940 is further configured to receive the adjustment command sent by the downlink scheduling unit 930, and adjust the TX power.

The uplink scheduling unit 910 is further configured to: receive power control information sent by the downlink scheduling unit 930, calculate an amount of Transmit (TX) power to be adjusted or an amount to which Transmit (TX) power is adjusted according to the power control information, and send an adjustment command to the uplink MS 920.

The uplink MS 920 is further configured to receive the adjustment command sent by the uplink scheduling unit, and adjust the TX power.

By using the method, apparatus, and system provided herein, the subcarriers of certain uplink bands can be shared by the relay station if the subcarriers are not occupied by the uplink MS, and the relay station can use such subcarriers to send data to the downlink MS, without causing mutual interference; when the subcarriers of certain uplink bands are occupied by the uplink MS but the uplink MS is far away from the downlink MS and the interference imposed onto the downlink MS is controllable, the relay station can transmit data to the downlink MS through such subcarriers, but need to exercise power control so that the interference imposed onto the BS is acceptable. Meanwhile, different subcarrier scheduling algorithms are provided herein to meet different requirements.

After reading the foregoing embodiments, those skilled in the art are clearly aware that the present invention may be implemented through hardware, or through software in addition to a necessary universal hardware platform. Therefore, the technical solution under the present invention may be embodied in a software product. The software product may be stored in non-volatile storage media such as a Compact Disk-Read Only Memory (CD-ROM), a Universal Serial Bus (USB) flash disk, or a mobile hard disk, and may incorporate several instructions that enable a computer device (such as a personal computer, a server, or a network device) to perform the methods specified in any embodiment of the present invention.

The above descriptions are merely exemplary embodiments of the present invention, but not intended to limit the scope of the present invention. Any modifications or variations that can be derived by those skilled in the art shall fall within the scope of the present invention.

What is claimed is:

1. A method for sharing a subchannel, comprising:
obtaining downlink state information and uplink state information of a subchannel; and
scheduling the subchannel according to the downlink state information and uplink state information of the subchannel, and allocating the subchannel to an uplink Mobile Station (MS) and/or a downlink MS;
wherein scheduling the subchannel according to the downlink state information and uplink state information of the subchannel comprises one or more processes of:
a process of:
calculating a sum of uplink traffic of the uplink MS corresponding to the subchannel and downlink traffic of the downlink MS corresponding to the subchannel according to channel quality and interference information in the uplink state information and downlink state information of the subchannel,
selecting a subchannel with the greatest sum of traffic and finding the corresponding uplink MS and downlink MS, and
allocating the selected subchannel to the corresponding uplink MS and downlink MS; and
a process of:
using channel quality and interference in the uplink state information as input, calculating a ratio of channel quality to interference for each subchannel, and selecting a subchannel with the greatest ratio and the corresponding uplink MS as a combination,
using channel quality and interference in the downlink state information as input, calculating a ratio of channel quality to interference for each subchannel, and selecting a subchannel with the smallest ratio and the corresponding downlink MS as a combination, and
comparing the ratio of uplink channel quality to interference with the ratio of downlink channel quality to interference, and allocating the subchannel in the combination with the greater ratio to the uplink MS or downlink MS in this combination.

2. The method according to claim 1, wherein:
obtaining the downlink state information and uplink state information of the subchannel comprises:
receiving, by a Base Station (BS), the downlink state information of the subchannel that is sent from the downlink MS, and measuring uplink state information of the subchannel.

3. The method according to claim 2, wherein:
the downlink state information received by the BS and from the downlink MS is processed by a relay station before being sent to the BS.

4. A method for sharing a subchannel, comprising:
scheduling a subchannel according to state information of the subchannel, and sending a scheduling command to an uplink Mobile Station (MS) or a downlink MS;
measuring uplink or downlink interference suffered; and
sending power control information to another scheduling unit if the uplink or downlink interference is greater than a preset threshold;
wherein scheduling the subchannel according to the state information of the subchannel comprises one or more processes of:
a process of:
using, by an uplink scheduling unit, channel quality and interference in uplink state information as input, selecting a subchannel with the greatest channel quality and least interference and an uplink MS corresponding to the subchannel as a combination, and allocating the subchannel in this combination to the uplink MS in this combination; and a process of:
using, by a downlink scheduling unit, channel quality and interference in downlink state information as input, selecting a subchannel with the greatest channel quality and least interference and a downlink MS corresponding to the subchannel as a combination, and allocating the subchannel in this combination to the downlink MS in this combination.

5. The method according to claim 4, wherein:
the another scheduling unit sends an adjustment command to the uplink MS or downlink MS to adjust Transmit (TX) power after receiving the power control information.

6. An apparatus for sharing an uplink spectrum, comprising:
an obtaining module, configured to obtain downlink state information and uplink state information of a subchannel; and
a scheduling module, configured to schedule the subchannel according to the downlink state information and uplink state information of the subchannel, and allocate the subchannel to an uplink Mobile Station (MS) and/or a downlink MS;
wherein the scheduling module comprises one or more modules of:
a first scheduling submodule, configured to calculate a sum of uplink traffic of the uplink MS corresponding to the subchannel and downlink traffic of the downlink MS corresponding to the subchannel according to channel quality and interference information in the uplink state information and downlink state information of the subchannel; select a subchannel with the greatest sum of traffic and find the corresponding uplink MS and downlink MS, and allocate the selected subchannel to the corresponding uplink MS and downlink MS; and
a second scheduling submodule, configured to: use channel quality and interference in the uplink state information as input, calculate a ratio of channel quality to interference for each subchannel, select a subchannel with the greatest ratio and an uplink MS corresponding to the subchannel as a combination; use channel quality and interference in the uplink state information as input, calculate a ratio of channel quality to interference for each subchannel, select a subchannel with the smallest ratio and a downlink MS corresponding to the subchannel as a combination; compare the two ratios to find the combination with the greater ratio, and allocate the subchannel in the combination with the greater ratio to the corresponding uplink MS or downlink MS.

7. The apparatus according to claim 6, wherein:
the apparatus is located in a Base Station (BS).

8. An apparatus for sharing an uplink spectrum, comprising:
a channel scheduling module, configured to schedule a subchannel according to state information of the subchannel;
a scheduling command sending module, configured to send a scheduling command to an uplink Mobile Station (MS) or a downlink MS;
a measuring module, configured to measure uplink or downlink interference suffered;

a comparing module, configured to compare the uplink or downlink interference measured by the measuring module with a preset threshold, and trigger an information sending module if the uplink or downlink interference is greater than the preset threshold; and
the information sending module, configured to send power control information to another scheduling unit;
wherein one or more of following is met:
when the channel scheduling module is located in an uplink scheduling unit, the channel scheduling module is configured to use channel quality and interference in the uplink state information as input, select a subchannel with the greatest channel quality and least interference and an uplink MS corresponding to the subchannel as a combination, and allocate the subchannel in this combination to the uplink MS in this combination; and
when the channel scheduling module is located in a downlink scheduling unit, the channel scheduling module is configured to use channel quality and interference in the downlink state information as input, select a subchannel with the greatest channel quality and least interference and a downlink MS corresponding to the subchannel as a combination, and allocate the subchannel in this combination to the downlink MS in this combination.

9. The apparatus according to claim 8, further comprising:
an information receiving module, configured to receive power control information sent by another scheduling unit;
an information calculating module, configured to calculate an amount of Transmit (TX) power to be adjusted or an amount to which Transmit (TX) power is adjusted according to the power control information received by the information receiving module; and
a second information sending module, configured to send an adjustment command to the uplink MS or downlink MS.

10. The apparatus according to claim 8, wherein:
the apparatus is located in an uplink scheduling unit or a downlink scheduling unit.

11. A system for sharing an uplink spectrum, comprising:
an uplink scheduling unit, configured to: schedule a subchannel according to state information of the subchannel and send a scheduling command to an uplink Mobile Station (MS); measure uplink interference suffered; and send power control information to a downlink scheduling unit if the uplink interference is greater than a preset threshold;
a downlink scheduling unit, configured to: schedule the subchannel according to the state information of the subchannel and send a scheduling command to a downlink MS; measure downlink interference suffered; and send power control information to the uplink scheduling unit if the downlink interference is greater than a preset threshold;
the uplink MS, configured to receive the scheduling command sent by the uplink scheduling unit and to use channel quality and interference in uplink state information as input, select a subchannel with the greatest channel quality and least interference and an uplink MS corresponding to the subchannel as a combination and allocate the subchannel in this combination to the uplink MS in this combination; and
the downlink MS, configured to receive the scheduling command sent by the downlink scheduling unit and to use channel quality and interference in downlink state information as input, select a subchannel with the greatest channel quality and least interference and a downlink MS corresponding to the subchannel as a combination and allocate the subchannel in this combination to the downlink MS in this combination.

12. The system according to claim 11, wherein:
the downlink scheduling unit is further configured to receive the power control information sent by the uplink scheduling unit, calculate an amount of Transmit (TX) power to be adjusted or an amount to which Transmit (TX) power is adjusted according to the power control information, and send an adjustment command to the downlink MS;
the downlink MS is further configured to receive the adjustment command sent by the downlink scheduling unit, and adjust the TX power;
the uplink scheduling unit is further configured to receive the power control information sent by the downlink scheduling unit, calculate an amount of Transmit (TX) power to be adjusted or an amount to which Transmit (TX) power is adjusted according to the power control information, and send an adjustment command to the uplink MS; and
the uplink MS is further configured to receive the adjustment command sent by the uplink scheduling unit, and adjust the TX power.

* * * * *